United States Patent [19]

Park

[11] Patent Number: 4,694,026

[45] Date of Patent: Sep. 15, 1987

[54] POLYOLEFIN FOAM COMPOSITIONS HAVING IMPROVED DIMENSIONAL STABILITY UTILIZING CERTAIN UNSATURATED NITROGEN-CONTAINING COMPOUNDS AND PROCESS FOR MAKING SAME

[75] Inventor: Chung P. Park, Pickerington, Ohio

[73] Assignee: The Dow Chemical Company, Midland, Mich.

[21] Appl. No.: 737,598

[22] Filed: May 24, 1985

[51] Int. Cl.$^4$ .............................................. C08J 9/14
[52] U.S. Cl. ........................................ 521/94; 264/53; 521/79; 521/81; 521/134; 521/143; 521/144; 521/149
[58] Field of Search ................ 521/79, 81, 94, 134, 521/149, 143

[56] References Cited

U.S. PATENT DOCUMENTS

| | | | |
|---|---|---|---|
| 3,644,230 | 2/1972 | Cronin | 260/2.5 E |
| 4,101,467 | 7/1978 | Park et al. | 521/79 |
| 4,214,054 | 7/1980 | Watanabe et al. | 521/95 |
| 4,289,857 | 9/1981 | Hoki et al. | 521/85 |
| 4,327,193 | 4/1982 | Hoki et al. | 521/88 |
| 4,331,777 | 5/1982 | Hoki et al. | 521/94 |
| 4,331,779 | 5/1982 | Park | 521/134 |
| 4,343,911 | 8/1982 | Hoki et al. | 521/88 |
| 4,343,913 | 8/1982 | Watanabe et al. | 521/79 |
| 4,345,041 | 8/1982 | Hoki et al. | 521/94 |
| 4,347,329 | 8/1982 | Park | 521/79 |
| 4,359,539 | 11/1982 | Hoki et al. | 521/79 |
| 4,368,276 | 1/1983 | Park | 521/79 |
| 4,369,257 | 1/1983 | Hoki et al. | 521/79 |
| 4,370,378 | 1/1983 | Zabrocki et al. | 521/79 |
| 4,387,169 | 6/1983 | Zabrocki et al. | 521/79 |
| 4,395,510 | 7/1983 | Park | 521/79 |
| 4,528,300 | 7/1985 | Park | 521/79 |

*Primary Examiner*—Morton Foelak
*Attorney, Agent, or Firm*—Cedric M. Richeson

[57] ABSTRACT

A process for dimensionally stabilizing low density foamed polyolefins utilizing a dimensionally stabilizing control additive comprising a nitrogen-containing compound (having an unsaturated leg) said compound represented by formulas (I) and (II):

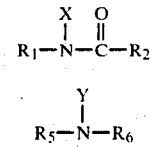

21 Claims, No Drawings

POLYOLEFIN FOAM COMPOSITIONS HAVING IMPROVED DIMENSIONAL STABILITY UTILIZING CERTAIN UNSATURATED NITROGEN-CONTAINING COMPOUNDS AND PROCESS FOR MAKING SAME

BACKGROUND OF THE INVENTION

The present invention relates to a process for dimensionally stabilizing flexible foam polyolefin articles utilizing a nitrogen-containing compound having an unsaturated hydrocarbon moiety.

Cellular plastics have many important uses. Today flexible foam articles made from polyolefins have well known applications in the packaging, construction, sports, appliance, and automotive markets. Important qualities of flexible foams and manufacturing processes therefor, include low shrinkage, dimensional stability, and cost of manufacture. Expanded (foamed) articles, as the term is used herein, are cellular polymers having a two-phase gas-solid system, in which the solid is continuous and comprises a synthetic polymer. The gas phase is usually distributed in cells within the article.

It is well known to make closed-cell olefinic polymer resin foams by the process of extrusion foaming wherein a normally solid thermoplastic olefinic polymer resin, such as polyethylene, is heat-plastified and mixed under pressure with a volatile material, such as 1,2-dichlorotetrafluoroethane (FC-114) to form a flowable gel which is then passed through a shaping orifice or die opening into a zone of lower pressure. Upon the release of pressure, the volatile constituent of the gel vaporizes, forming a gas-phase cellular structure in the gel which cools to a corresponding cellular foamed solid resin. Desirably, the resulting gas cells are substantially uniform in size, uniformly distributed through the foam body, and closed, i.e., separated from each other by membrane walls of resin. Although a number of general principles are thought to be understood, much of the extrusion foaming technology is empirical.

One of the common requirements of acceptable foam resin products is dimensional stability, i.e., it is desired that the linear dimension and volume of a piece of foam resin not change appreciably, either to shrink or to expand, under ordinary conditions, from the time its manufacture is complete until the time its ultimate useful life is ended. It is also desired that if any appreciable shrinking of a foam is to occur, which is usually the case with a freshly extruded foam, the foam be able to recover within a reasonable period of time to a substantially constant volume close to that of the foam measured shortly after its extrusion.

With respect to dimensional stability, it is noted that the vapors of volatile material originally present in foam cells gradually permeate the cell wall and escape from the foam over a period of time, thereby tending to reduce the inner cell pressure and tending to cause the foam to shrink during that time. However, when the foam is exposed to ambient atmosphere, air and its constituent gases also tend to permeate into the foam through the cell wall over a period of time, thereby increasing the inner cell pressure. By virtue of the possibly differing relative rates of permeation of the blowing agent out of and air into the cellular structure, there exists the potential for the development of a significant pressure differential (relative to ambient air pressure) within such cellular structure with attendant shrinking or expansion thereof during the indicated air/blowing agent interchange therein. Accordingly, the difficulties of attaining dimensional stability present a problem frequently encountered which is particularly acute in foams of relatively low density (high expansion ratio) when the resin membrane cell walls are relatively thin.

Many additives have been proposed which ameliorate the dimensional stability problem in various compositions and processes.

U.S. Pat. No. 4,214,054 (Watanabe et al) describes expanded polymer articles and a process for making same from synthetic resins such as polyethylene or ethylene-vinyl acetate copolymer resin utilizing 0.1 to 10 weight percent of an additive comprising saturated higher fatty acid amides, saturated higher aliphatic amines and complete esters of saturated higher fatty acids. The expanded articles so-made are described as having little shrinkage after expansion.

U.S. Pat. No. 4,368,276 (Park) describes the use of certain N-substituted fatty acid amide compounds of formula A:

wherein $R_1$ represents an alkyl group of from 11 to 17 carbon atoms and $R_2$ represents an alkyl group of from 12 to 18 carbon atoms. The described amides which have saturated branches include such compounds as N-stearyl stearamide, N-palmityl palmitamide, etc.

U.S. Pat. No. 4,345,041 (Hoki et al) describes the use of an N-higher aliphatic hydrocarbyl substituted amide of a $C_1$–$C_8$ aliphatic carboxylic acid as a shrinkage control agent for olefin polymer foams. Suitable stabilizers are said to include amides of formula B:

wherein $R_1$ is an aliphatic hydrocarbon group having 10 to 24 carbon atoms; $R_2$ is a hydrogen atom, an aliphatic hydrocarbon group having 1 to 24 carbon atoms or a oxyalkylene or polyoxyalkylene group represented by $(-R_4-O-)_n A$ wherein $R_4$ is a residual group of an aliphatic polyhydric alcohol having 1 to 5 carbon atoms, A is a hydrogen atom or a residual group of an aliphatic carboxylic acid having 1 to 24 carbon atoms and n is an integer ranging from 1 to 20; and $R_3$ is a hydrogen atom or a aliphatic hydrocarbon group having 1 to 7 carbon atoms.

U.S. Pat. No. 4,331,779 (Park) describes ethylenic polymer foams having improved dimensional stability which foams utilize (during the preparation thereof) a monoethylenically unsaturated carboxylic acid such as acrylic acid.

While the above compositions have been found useful in dimensionally stabilizing certain polymer foams, it is desirable to provide additional stabilizing additives for greater process operational flexibility.

SUMMARY OF THE INVENTION

It is an object of the invention to provide a more economical flexible foam article.

A further object of the invention is to provide a process and article made therefrom which is environmentally safer.

A further object of the invention is to provide a cellular material having improved dimensional stability.

A further object of the invention is to provide a flexible foam having improved physical properties.

Other objects and advantages of the present invention are brought out in the description that follows.

It is not necessary that each and every object listed above be found in all embodiments of the invention. It is sufficient that the invention may be advantageously employed when compared to the prior art.

The foregoing objects are achieved in a dimensionally stable, flexible foam article and in a process for making cellular material which heat plastifies a normally solid olefin polymer resin; admixes the heat plastified resin, generally under elevated temperature, with (1) a blowing agent and (2) a dimensional stability control agent comprising at least one nitrogen-containing compound of formulas I or II:

$$R_1-\underset{\underset{X}{|}}{N}-\underset{\underset{}{\overset{O}{\|}}}{C}-R_2 \qquad I$$

wherein: $R_1$ is (a) an alkyl group having 9 to 23 carbon atoms, (b) a hydrocarbon residue of a saturated fatty acid having 9 to 23 carbon atoms, (c) a saturated acyl group having 10 to 24 carbon atoms, (d) a saturated substituent organic group containing a subgroup of the formula $-(R_3O)_m-$ wherein $R_3$ is an alkylene group having 1 to 5 carbon atoms and m is an integer from 1 to 10, (e) an unsaturated organic group having 9 to 23 carbon atoms, (f) a hydrocarbon residue of an unsaturated fatty acid having from 9 to 23 carbon atoms, (g) an unsaturated acyl group having 10 to 24 carbon atoms, or (h) an unsaturated substituent organic group containing a subgroup of the formula $-(R_4O)_m-$ wherein $R_4$ is an alkylene group having 1 to 5 carbon atoms and m is an integer from 1 to 10, $R_2$ is a, b, c or d when $R_1$ is e, f, g or h and $R_2$ is e, f, g or h when $R_1$ is a, b, c, or d; and X is a hydrogen atom, an alkyl group having 1 to 24 carbon atoms, an unsaturated organic group having from 2 to 23 carbon atoms, b, c, d, f, g, or h;

$$R_5-\underset{\underset{}{\overset{Y}{|}}}{N}-R_6 \qquad II$$

wherein $R_5$ is a, b, c or d, $R_6$ is e, f, g or h, and Y is an hydrogen atom, an alkyl group having from 1 to 24 carbon atoms, an unsaturated organic group having from 2 to 23 carbon atoms, b, d, f or h; And then extruding the resulting mixture, generally into a zone of lower temperature and pressure to thereby form a dimensionally stabilized olefin polymer foam.

Fundamental to the present invention is the use of a nitrogen-containing compound having both an unsaturated hydrocarbon moiety and a saturated hydrocarbon moiety as described above.

Beneficially, stable flexible cellular materials of substantially closed-cell structure having a density of from about 0.6 to about 20 pounds per cubic foot are produced.

DETAILED DESCRIPTION OF THE INVENTION

Olefin polymers suitable for use in the practice of the present invention include homopolymers of ethylene as well as copolymers thereof with other monomers such as propylene, butene-1 and other olefins (especially alpha-olefins); vinyl esters of saturated carboxylic acids such as vinyl acetate, vinyl propionate, and the like; alkyl esters of monoethylenically unsaturated carboxylic acids such as methyl acrylate or methacrylate, ethyl acrylate or methacrylate, propyl acrylate or methacrylate, the several butyl and isobutyl acrylates and methacrylates, 2-ethylhexyl acrylate, dimethylmaleate and the like; the various monoethylenically unsaturated carboxylic acids themselves such as, for example, acrylic acid, methacrylic acid, etc., and the like. Polymers of particular interest for use herein are polyethylene, ethylene-vinyl acetate copolymers and ethylene acrylic acid copolymers.

Naturally, blends of two or more olefin polymers can be suitably employed in the practice of the present invention. Suitable resins for blending include polymer, copolymer or ionomer resins such as low, medium, or high density polyethylene, ethylene-propylene copolymer, ethylene-acrylic acid copolymer, ethylene-methacrylate copolymer, ethylene vinyl acetate copolymer and the like. Methods for making olefinic polymer resins described herein above are readily known in the art.

The blending step may be carried out by any of the techniques known to the art. Thus the resin components, in the form of a powder or granules, may be primarily dry-blended or tumbled and subsequently melt blended. Other techniques of blending will be apparent to those skilled in the art.

The foam articles of the present invention can be conveniently prepared using conventional extrusion foaming principles, processes and equipment by heat plastifying a normally solid olefin polymer resin and incorporating into such heat plastified polymer at elevated temperature and pressure (1) a volatile blowing agent, and (2) a stabilizing amount of a nitrogen-containing compound selected from compounds of formulas I and II:

$$R_1-\underset{\underset{X}{|}}{N}-\underset{\underset{}{\overset{O}{\|}}}{C}-R_2 \qquad I$$

wherein: $R_1$ is (a) an alkyl group having 9 to 23 carbon atoms, (b) a hydrocarbon residue of a saturated fatty acid having 9 to 23 carbon atoms, (c) a saturated acyl group having 10 to 24 carbon atoms, (d) a saturated substituent organic group containing a subgroup of the formula $-(R_3O)_m-$ wherein $R_3$ is an alkylene group having 1 to 5 carbon atoms and m is an integer from 1 to 10, (e) an unsaturated organic group having 9 to 23 carbon atoms, (f) a hydrocarbon residue of an unsaturated fatty acid having from 9 to 23 carbon atoms, (g) an unsaturated acyl group having 10 to 24 carbon atoms, or (h) an unsaturated substituent organic group containing a subgroup of the formula $-(R_4O)_m-$ wherein $R_4$ is an alkylene group having 1 to 5 carbon atoms and m is an integer from 1 to 10, $R_2$ is a, b, c or d when $R_1$ is e, f, g or h and $R_2$ is e, f, g or h when $R_1$ is a, b, c, or d; and X is a hydrogen atom, an alkyl group having 1 to 24 carbon atoms, an unsaturated organic group having from 2 to 23 carbon atoms, b, c, d, f, g, or h;

$$R_5-\underset{\underset{}{\overset{Y}{|}}}{N}-R_6 \qquad II$$

wherein $R_5$ is a, b, c or d, $R_6$ is e, f, g or h, and Y is an hydrogen atom, an alkyl group having from 1 to 24 carbon atoms, an unsaturated organic group having from 2 to 23 carbon atoms, b, d, f or h, to form a flowable gel of an expandable olefin polymer composition and thereafter extruding the gel into a zone of lower pressure and temperature to form the desired substantially closed-cell olefin polymer foam.

Preferably, the above-noted nitrogen-containing compounds are the stability control agents of formula I. As has been noted, a key feature of the present invention resides in the use of a small amount of an N-substituted fatty acid amide or amine of formula I and/or II as set forth above in conjunction with the above-described olefin polymers to provide olefin polymer foams having, in fresh foam form, improved dimensional stability.

Beneficially, in suitable compounds of formulas I and II, X and/or Y will be an alkyl group having from 1 to 24 carbon atoms. Advantageously X and/or Y will be an alkyl group having from 1 to 7 carbon atoms. Preferably X and/or Y will be hydrogen.

A preferred group of stability control agents are the aforementioned N-substituted fatty acid amides. Beneficially, such amides include erucyl stearamide, palmityl oleamide, behenyl erucamide, erucyl behenamide, stearyl oleamide, oleyl stearamide, etc. Advantageously, N-stearyl erucamide and N-oleyl palmitamide are employed.

In addition to the above-described N-substituted fatty acid amides and amines, there may also be employed, as auxiliary stability control agents, in the practice of the present invention, certain other compounds such as, for example, the higher alkyl amines, the fatty acid esters and the fatty acid amides (e.g. stearamide) different from those of the present invention which auxiliary agents are described in U.S. Pat. No. 4,214,054 (Watanabe et al) or the N-substituted amides described in U.S. Pat. No. 4,368,276 (Park) the disclosures of which are hereby incorporated by reference.

The term "substantially closed-cell structure" as used herein means that the foamed articles thereby referred to contain less than about 20 (preferably less than about 15) percent of open cells (as determined by ASTM D-2856, Procedure A) therein.

The volatile organic blowing agent is mixed with a starting olefin polymer resin in proportions suitable to provide the desired degree of expansion in the resulting foamed cellular product. Depending upon such variables as the starting proportion of blowing agent, the resulting foam products of the present invention will typically have densities in the range from about 0.6 to about 20 pounds per cubic foot. Beneficially these resulting foams will have a density of from about 0.6 to about 15 pounds per cubic foot. Advantageously, foams resulting from the process of the present invention will have foam densities ranging from about 1.0 to about 6.0 pounds per cubic foot.

Conventional volatile organic blowing agents may suitably be employed in the present invention either alone or in conjunction with thermally decomposable gas-releasing chemical blowing agents. Preferably, volatile blowing agents are employed which have an atmospheric boiling point below the melting point of the starting resin employed. Suitable blowing agents include halogenated hydrocarbon compounds having from 1 to 4 carbon atoms e.g. dichlorodifluoromethane (FC-12), trichlorofluoromethane (FC-11), 1,2-dichlorotetrafluoroethane (FC-114), 1-chloro-1,1-difluoroethane (FC-142b), etc., as well as hydrocarbons having 3–5 carbon atoms such as propane, n-butane, isobutane, n-pentane, isopentane and neopentane. Mixtures of two or more blowing agents are also suitably employed. Beneficially, 1,2-dichlorotetrafluoroethane (FC-114) may be utilized. Advantageously, the stability control agents of the present invention allow use of a relatively inexpensive blowing agent viz dichlorodifluoromethane (FC-12) to produce foams at lower cost. Also, dichlorodifluoromethane may be beneficially mixed with other blowing agents such as: 1,2-dichlorotetrafluoroethane (FC-114); n-butane; isobutane, trichlorofluoromethane (FC-11); or ethyl chloride. FC-142b, a blowing agent which is considered less harmful to the atmospheric ozone layer due to its shorter half-life than FC-114, may also be used.

In practice, the amount of the aforementioned blowing agents employed in practicing the present invention will vary and will be chosen primarily to obtain the particular foam density sought to be manufactured via such process. However, as a general rule the amount of such blowing agent employed will typically be in the range of from about 0.013 to about 0.50 gram-mole of the blowing agent per 100 grams of the olefin polymer resin to be foamed therewith. Preferably the above range will be about 0.04 to 0.30 gram-mole of blowing agent per 100 grams resin.

In addition to the hereinbefore described ingredients, there may also be employed in the practice of the present invention other ingredients or additives which conventionally find applicability in known extrusion foaming processes such as, for example, known nucleating (or cell-size controlling) agents, e.g., talc, clay, mica, silica, titanium oxide, zinc oxide, calcium silicate, metallic salts of fatty acids such as barium stearate, zinc stearate, aluminum stearate, etc., wetting agents, fillers, pigments, lubricants, anti-oxidants, mixing aids, and the like.

For purposes of the present invention, dimensional stability of the foamed articles refers to changes which occur in foamed article volume, particularly in later stages of manufacture and during subsequent storage of the foamed article. The dimensional stability of the foamed articles is measured by observing the changes in volume occurring in a test specimen of the foam article as a function of time. A test specimen is obtained by quickly cutting, from the foamed article soon (e.g. within about five minutes) after its formation, a piece of foamed article and accurately measuring its overall volume, e.g., by cubic displacement of water. The initial volume of this specimen is arbitrarily selected as the benchmark volume for the subsequent dimensional stability study. The foam article specimen is exposed to air at atmospheric pressure at ordinary room temperature; its volume is remeasured from time to time and related on a volume percentage basis to the initial volume.

For purposes of the present invention, a flexible foamed article is considered to be dimensionally stable for practical purposes if the minimum volume to which the foam article shrinks is not less than about 70 (preferably not less than about 85) percent of the initial benchmark volume, and if the volume of the foamed article four weeks after its extrusion is substantially constant thereafter under ambient atmospheric conditions. The term "dimensionally stable" in reference to the subject cellular flexible foamed articles is used here in the sense of the foregoing definitive description. Advantageously, preferred dimensionally stable foamed articles of the present invention will have a volume four weeks (preferably three weeks) after its extrusion of not less than 80 percent of the initial volume and preferably not less than 90 percent of the initial volume.

Suitable flexible foamed articles of the present invention have a substantially closed-cell structure as heretofore defined. Beneficially, the cellular flexible foamed articles will have a foamed density from about 0.6 to 20 pounds per cubic foot. Advantageously, articles having a foamed density of from about 0.6 to 15 pounds per cubic foot will be formed. In a preferred embodiment an expanded, flexible foamed article of the invention is produced, which has a substantially closed-cell structure comprising a polyethylene containing polymer and a blowing agent, with an amide of formula I of the present invention being present in an amount sufficient to prevent a freshly prepared foam made from such composition from shrinking by more than about 20 percent from its initial foamed volume when subjected to prolonged exposure to atmospheric air pressure. Advantageously, the above-noted foamed articles will shrink less than about 15% and preferably less than about 10%. In a beneficially preferred embodiment foamed articles of the present invention will have a foamed density of from about 1.0 to 6.0 pounds per cubic foot.

The following examples, in which all parts and percentages are on a weight basis unless otherwise indicated, are presented as illustrative of the present invention and are not to be understood as limiting its scope.

EXAMPLES 1 AND 2

The apparatus used in this example is a 1¼ inch screw-type extruder having additional zones for mixing and cooling at the end of usual sequential zones for feeding, melting, and metering. An opening for blowing agent injection is provided on the extruder barrel between metering and mixing zones. At the end of the cooling zone, there is attached a die orifice having an opening of rectangular shape. The heighth of the opening is adjustable while its width is fixed at 0.25 inches.

An olefin polymer is uniformly mixed with a 5 weight percent concentrate of Kemamide E-180 or P-181 brand type substituted amide so that the level of the additive becomes about 2 parts per 100 parts of total polymer. A small amount (0.7 parts per hundred parts of polymer) of talcum powder is also mixed in by use of a wetting agent.

Then the mixture is fed to an extruder of 1¼ inch screw diameter through a hopper at a uniform rate of about 10 pounds per hour. The extruder zone temperatures are maintained at about 75° C. at the feeding zone, about 170° C. at the melting and metering zones, and about 150° C. at the mixing zone.

A foaming agent is injected into the injection port under pressure at a predetermined rate. The foaming agent is uniformly dissolved in the polymer at the mixing zone. The temperature of the cooling zone is adjusted so that the temperature of the gel is brought down to an optimum temperature for foam expansion. The die opening is adjusted to have a smooth foam skin. The foam body of an approximately rectangular cross-section with rounded corners is conducted away from the die opening.

Two samples, approximately 7 inches long, are cut at the die. Weights, volumes and dimensions of the samples are determined within about 5 minutes after extrusion. After initial determination weights and volumes of the samples are periodically rechecked. Test parameters and results are summarized in table 1 and table 2. Test numbers 1.1, 1.2, 2.1 and 2.2 are examples of the present invention, while test numbers 1.3, 2.3, 2.4 and 2.5 are counter-examples (not of the present invention). The foaming agents used in these examples are 1,2-dichlorotetrafluoroethane (FC-114) and dichlorodifluoromethane (FC-12).

In Example 1 (Test Nos. 1.1–1.3) EVA designates a commercially available ethylene/vinyl acetate copolymer having 18 percent vinyl acetate and a 2.5 melt index. As can be seen from the results shown in Tables 1 and 2, good quality dimensionally stable foams having substantially closed-cell structure are produced from ethylene/vinyl acetate copolymer using either stearyl erucamide or oleyl palmitamide as a stabilizing additive. In contrast, counter-example 1.3 conducted without any additive shrinks excessively during aging and has poor dimensional stability.

In Example 2 (Tests Nos. 2.1–2.5) PE designates a commercially available low density polyethylene polymer having a melt index of 2.3 and a density of 0.9210 g/cc. As demonstrated by the results shown in Tables 1 and 2 polyethylene foams utilizing the stability control agents disclosed by the present invention have little shrinkage and excellent dimensional stability. In contrast, the counter-examples show that either use of no stabilizing additive or use of similar but more unsaturated nitrogen-containing compositions such as oleamide or erucyl erucamide shrink greatly and fail to act as dimensional stabilizing agents.

TABLE 1

| Test No. | Polymer type | Additive Type (1) | Additive Level (pph) (2) | Blowing Agent Type | Blowing Agent Level (pph) (3) | Foaming Temp. (°C.) (4) | Foam Thickness (in) (5) | Foam Width (in) (6) | Cell Size (mm) (7) | Foam Density (pcf) (8) |
|---|---|---|---|---|---|---|---|---|---|---|
| 1.1 | EVA | E-180 | 2 | FC-114 | 40.2 | 81 | 1.03 | 1.35 | 0.68 | 1.55 |
| 1.2 | EVA | P-181 | 2 | FC-114 | 36.2 | 81 | 0.95 | 1.33 | 0.48 | 1.65 |
| *1.3 | EVA | None | 0 | FC-114 | 38.7 | 81 | 1.05 | 1.38 | 0.74 | 1.59 |
| 2.1 | PE | E-180 | 2 | FC-12 | 17.0 | 108 | 0.77 | 1.14 | 0.77 | 2.40 |
| 2.2 | PE | P-181 | 5 | FC-12 | 17.0 | 108 | 1.28 | 1.38 | — | 2.29 |
| *2.3 | PE | None | 0 | FC-12 | 17.5 | 108 | 1.26 | 1.32 | 1.62 | 2.26 |
| *2.4 | PE | U | 1.0 | FC-12 | 18.0 | 108 | 0.67 | 0.84 | — | 1.89 |

TABLE 1-continued

| Test No. | Polymer type | Additive Type (1) | Additive Level (pph) (2) | Blowing Agent Type | Blowing Agent Level (pph) (3) | Foaming Temp. (°C.) (4) | Foam Thickness (in) (5) | Foam Width (in) (6) | Cell Size (mm) (7) | Foam Density (pcf) (8) |
|---|---|---|---|---|---|---|---|---|---|---|
| *2.5 | PE | E-221 | 3.3 | FC-12 | 16.7 | 108 | 1.20 | 1.38 | 1.35 | 2.14 |

Notes:
*Not an example of this Invention
(1) Kemamide ™ brand fatty acid amides made by Humko Chemical Division of Witco Chemical Corporation. U = oleamide; E-221 = erucyl erucamide; E-180 = stearyl erucamide; P-181 = oleyl palmitamide.
(2) parts of stability control additive mixed in per hundred parts of polymer.
(3) part of blowing agent mixed in per hundred parts of polymer
(4) temperature of polymer/blowing agent gel proceeding to foam expansion
(5) thickness of foam body measured within five minutes after foam expansion
(6) width of foam body measured within five minutes after foam expansion
(7) cell size per ASTM D-3576
(8) density of foam body in pounds per cubic foot measured within five minutes after foam extrusion

TABLE 2

| Test. No. | Time for Min. Vol. (day) (9) | Min. Vol. (10) | Foam Dimensional Stability (% of Initial Volume) | | | | |
|---|---|---|---|---|---|---|---|
| | | | 1 wk (11) | 2 wk (11) | 3 wk (11) | 4 wk (11) | 5 wk (11) |
| 1.1 | 1 | 90 | 99 | 100 | 100 | 100 | 101 |
| 1.2 | 1 | 86 | 91 | 90 | 90 | 90 | 90 |
| *1.3 | 2 | 50 | 53 | 57 | 59 | 61 | 65 |
| 2.1 | 0.04 | 87 | 97 | 98 | 98 | 97 | 97 |
| 2.2 | 4 | 85 | 86 | 85 | 86 | 87 | 88 |
| *2.3 | 5 | 62 | 62 | 69 | 76 | 80 | 83 |
| *2.4 | 1 | 48 | 64 | 72 | 82 | 87 | 89 |
| *2.5 | 7 | 56 | 56 | 59 | 61 | 66 | 74 |

Notes:
*Not an example of this Invention
(9) time in days from foam extrusion to the time when foam shrinkage reaches the maximum
(10) minimum volume of foam body during aging as percentage of initial volume after indicated period from foam extrusion
(11) volume of foam body as percentage of initial volume after indicated period from extrusion

EXAMPLE 3

In Example 3, test parameters and procedures are the same as in Example 1, except as indicated below. Generally Example 1 was repeated, but utilizing FC-12 as the blowing agent. The level of talcum powder is 1.0 pph for Tests 3.1—3.3. As demonstrated by the results shown in Tables 3 and 4 use of a dimensional stability control agent according to the present invention is shown to yield significantly improved dimensional stability over foam containing no additives.

TABLE 3

| Test No. | Polymer type | Additive Type (1) | Additive Level (pph) (2) | Blowing Agent Type | Blowing Agent Level (pph) (3) | Foaming Temp. (°C.) (4) | Foam Thickness (in) (5) | Foam Width (in) (6) | Cell Size (mm) (7) | Foam Density (pcf) (8) |
|---|---|---|---|---|---|---|---|---|---|---|
| 3.1 | EVA | E-180 | 2 | FC-12 | 28 | 81 | 1.07 | 1.33 | 1.08 | 1.50 |
| 3.2 | EVA | P-181 | 2 | FC-12 | 29 | 81 | 0.98 | 1.34 | 0.81 | 1.51 |
| *3.3 | EVA | None | 0 | FC-12 | 25.5 | 81 | 1.17 | 1.38 | 1.25 | 1.96 |

Notes:
*Not an example of this Invention
(1) Kemamide ™ brand fatty acid amides made by Humko Chemical Division of Witco Chemical Corporatio. U = oleamide; E-221 = erucyl erucamide; E-180 = stearyl erucamide; P-181 = oleyl palmitamide.
(2) parts of stability control additive mixed in per hundred parts of polymer.
(3) part of blowing agent mixed in per hundred parts of polymer
(4) temperature of polymer/blowing agent gel proceeding to foam expansion
(5) thickness of foam body measured within five minutes after foam expansion
(6) width of foam body measured within five minutes after foam expansion
(7) cell size per ASTM D-3576
(8) density of foam body in pounds per cubic foot measured within five minutes after foam extrusion

TABLE 4

| Test No. | Time for Min. Vol. (day) (9) | Min. Vol. (10) | Foam Dimensional Stability (% of Initial Volume) | | | | |
|---|---|---|---|---|---|---|---|
| | | | 1 wk (11) | 2 wk (11) | 3 wk (11) | 4 wk (11) | 5 wk (11) |
| 3.1 | 1 | 86 | 88 | 89 | 89 | 91 | 92 |
| 3.2 | 14 | 72 | 76 | 72 | 74 | 74 | 73 |
| *3.3 | 4 | 40 | 46 | 47 | 50 | 55 | 59 |

Notes:
*Not an example of this Invention
(9) time in days from foam extrusion to the time when foam shrinkage reaches the maximum
(10) minimum volume of foam body during aging as percentage of initial volume after indicated period from foam extrusion
(11) volume of foam body as percentage of initial volume after indicated period from extrusion Further modifications of the invention disclosed will be apparent to those skilled in the art and all such modifications are deemed to be within the scope of the invention as defined by the following claims.

What is claimed is:

1. A process for dimensionally stabilizing low density foamed polyolefins comprising expanding an olefin polymer under foaming conditions in the presence of a stabilizing amount of a nitrogen-containing compound selected from the group consisting of the compounds of formulas (I) and (II):

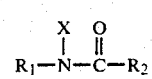

$$R_1 - \overset{X}{\underset{|}{N}} - \overset{O}{\overset{\|}{C}} - R_2 \qquad \text{I}$$

wherein: $R_1$ is (a) an alkyl group having 9 to 23 carbon atoms, (b) a hydrocarbon residue of a saturated fatty acid having 9 to 23 carbon atoms, (c) a saturated acyl group having 10 to 24 carbon atoms, (d) a saturated substituent organic group containing a subgroup of the formula —$(R_3O)_m$— wherein $R_3$ is an alkylene group having 1 to 5 carbon atoms and m is an integer from 1 to 10, (e) an unsaturated organic group having 9 to 23 carbon atoms, (f) a hydrocarbon residue of an unsaturated fatty acid having from 9 to 23 carbon atoms, (g) an unsaturated acyl group having 10 to 24 carbon atoms, or (h) an unsaturated substituent organic group containing a subgroup of the formula —$(R_4O)_m$— wherein $R_4$ is an alkylene group having 1 to 5 carbon atoms and m is an integer from 1 to 10, $R_2$ is a, b, c or d when $R_1$ is e, f, g or h and $R_2$ is e, f, g or h when $R_1$ is a, b, c, or d; and X is a hydrogen atom, an alkyl group having 1 to 24 carbon atoms, an unsaturated organic group having from 2 to 23 carbon atoms, b, c, d, f, g, or h;

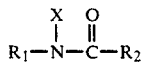

wherein $R_5$ is a, b, c or d, $R_6$ is e, f, g or h, and Y is an hydrogen atom, an alkyl group having from 1 to 24 carbon atoms, an unsaturated organic group having from 2 to 23 carbon atoms, b, d, f or h.

2. A process for dimensionally stabilizing low density foamed polyolefins comprising expanding an olefin polymer under foaming conditions in the presence of a stabilizing amount of at least one nitrogen-containing compound of formula (I):

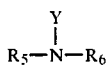

wherein: $R_1$ is (a) an alkyl group having 9 to 23 carbon atoms, (b) a hydrocarbon residue of a saturated fatty acid having 9 to 23 carbon atoms, (c) a saturated acyl group having 10 to 24 carbon atoms, (d) a saturated substituent organic group containing a subgroup of the formula —$(R_3O)_m$— wherein $R_3$ is an alkylene group having 1 to 5 carbon atoms and m is an integer from 1 to 10, (e) an unsaturated organic group having 9 to 23 carbon atoms, (f) a hydrocarbon residue of an unsaturated fatty acid having from 9 to 23 carbon atoms, (g) an unsaturated acyl group having 10 to 24 carbon atoms, or (h) an unsaturated substituent organic group containing a subgroup of the formula —$(R_4O)_m$— wherein $R_4$ is an alkylene group having 1 to 5 carbon atoms and m is an integer from 1 to 10, $R_2$ is a, b, c or d when $R_1$ is e, f, g or h and $R_2$ is e, f, g or h when $R_1$ is a, b, c, or d; and X is a hydrogen atom, an alkyl group having 1 to 24 carbon atoms, an unsaturated organic group having from 2 to 23 carbon atoms, b, c, d, f, g, or h.

3. A process as defined in claim 2 wherein said nitrogen-containing compound comprises N-stearyl erucamide.

4. A process as defined in claim 2 wherein said nitrogen-containing compound comprises N-oleyl palmitamide.

5. A process for preparing substantially closed-cell olefin polymer foamed articles having good dimensional stability which process comprises the steps of:
(a) heat plastifying an olefin polymer resin;
(b) admixing said heat plastified resin under elevated temperature and pressure with (1) a blowing agent, and (2) a dimensional stability control agent comprising at least one nirogen-containing compound of Formula I:

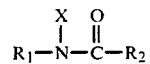

wherein: $R_1$ is (a) an alkyl group having 9 to 23 carbon atoms, (b) a hydrocarbon residue of a saturated fatty acid having 9 to 23 carbon atoms, (c) a saturated acyl group having 10 to 24 carbon atoms, (d) a saturated substituent organic group containing a subgroup of the formula —$(R_3O)_m$— wherein $R_3$ is an alkylene group having 1 to 5 carbon atoms and m is an integer from 1 to 10, (e) an unsaturated organic group having 9 to 23 carbon atoms, (f) a hydrocrbon residue of an unsaturated fatty acid having from 9 to 23 carbon atoms, (g) an unsaturated acyl group having 10 to 24 carbon atoms, or (h) an unsaturated substituent organic group containing a subgroup of the formula —$(R_4O)_m$— wherein $R_4$ is an alkylene group having 1 to 5 carbon atoms and m is an integer from 1 to 10, $R_2$ is a, b, c or d when $R_1$ is e, f, g or h and $R_2$ is e, f, g or h when $R_1$ is a, b, c, or d; and X is a hydrogen atom, an alkyl group having 1 to 24 carbon atoms, an unsaturated organic group having from 2 to 23 carbon atoms, b, c, d, f, g, or h; and
(c) extruding the resultant mixture into a zone of lower temperature and pressure to thereby form said dimensionally stabilized olefin polymer foam.

6. A process as defined in claim 5 wherein said dimensional stability control agent is employed in an amount of from about 0.1 to about 10 weight percent based upon the weight of said olefin polymer resin.

7. A process as defined in claim 5 wherein said dimensional stability control agent is employed in an amount of from about 0.2 to about 5.0 weight percent relative to said resin.

8. A process as defined in claim 5 wherein said polymer foam of step (c) is a flexible foam having a foam density of from about 0.6 to about 15 pounds per cubic foot.

9. A process as defined in claim 5 wherein said polymer foam of step (c) is a flexible foam having a foam density of from about 1.0 to about 6.0 pounds per cubic foot.

10. A process as defined in claim 5 wherein said blowing agent comprises a halogenated hydrocarbon having from 1 to 4 carbon atoms or mixtures thereof.

11. A process as defined in claim 5 wherein said blowing agent comprises dichlorodifluoromethane (FC-12).

12. A process as defined in claim 5 wherein said blowing agent comprises 1,2-dichlorotetrafluoroethane (FC-114).

13. A process as defined in claim 5 wherein said olefin polymer resin of step (a) comprises a homopolymer of ethylene, a copolymer thereof with up to about 50 weight percent of vinyl acetate, propylene, butene-1, butadiene, vinyl chloride, methyl methacrylate or acrylonitrile or a substantially non-neutralized copolymer of ethylene with up to about 50 weight percent of acrylic acid.

14. A process as defined in claim 5 wherein the olefin polymer resin of step (a) is polyethylene.

15. A process as defined in claim 5 wherein the olefin polymer resin of step (a) is low density polyethylene.

16. A process as claimed in claim 5 wherein the olefin polymer resin of step (a) is a copolymer of ethylene and vinyl acetate.

17. A process as defined in claim 5 wherein said blowing agent is dichlorodifluoromethane, 1,2-dichlorotetrafluoroethane, 1-chloro-1,1-difluoroethane, trichlorofluoromethane, n-butane, isobutane, n-pentane, isopentane, neopentane, ethyl chloride or mixtures thereof.

18. A process as defined in claim 5 wherein said blowing agent comprises isobutane.

19. A process as defined in claim 5 wherein X is hydrogen.

20. A process as defined in claim 5 wherein X is an alkyl group having from 1 to 24 carbon atoms.

21. A process as defined in claim 2 wherein X is hydrogen.

* * * * *